(12) United States Patent
Olofsson

(10) Patent No.: US 6,460,337 B1
(45) Date of Patent: Oct. 8, 2002

(54) COMBUSTION ENGINE

(75) Inventor: Eric Olofsson, Ronninge (SE)

(73) Assignee: SAAB Automobile AB (SE)

( * ) Notice: Subject to any disclaimer, the term of this patent is extended or adjusted under 35 U.S.C. 154(b) by 0 days.

(21) Appl. No.: 09/806,623

(22) PCT Filed: Oct. 4, 1999

(86) PCT No.: PCT/SE99/01759
§ 371 (c)(1),
(2), (4) Date: Apr. 2, 2001

(87) PCT Pub. No.: WO00/23698
PCT Pub. Date: Apr. 27, 2000

(30) Foreign Application Priority Data

Oct. 5, 1909 (SE) .............................................. 9803368

(51) Int. Cl.$^7$ ................................................ F02B 33/44
(52) U.S. Cl. .................... 60/605.1; 60/602; 123/562; 123/316; 123/90.15; 123/90.16; 123/90.17; 123/90.18
(58) Field of Search ................................ 60/605.1, 602; 123/316, 598, 562, 90.15, 90.16, 90.17, 90.18

(56) References Cited

U.S. PATENT DOCUMENTS 5,531,193 A  7/1996  Nakamura ............... 123/90.15

FOREIGN PATENT DOCUMENTS

| EP | 0761950 | | 12/1997 | |
|----|---------|---|---------|---|
| JP | 361164039 A | * | 7/1986 | .................. 123/562 |
| JP | 405263671 A | * | 10/1993 | .................. 60/605.1 |
| WO | WO-94/07010 | * | 3/1994 | .................. 60/602 |

* cited by examiner

*Primary Examiner*—Thomas Denion
*Assistant Examiner*—Thai-Ba Trieu
(74) *Attorney, Agent, or Firm*—Ostrolenk, Faber, Gerb & Soffen, LLP

(57) ABSTRACT

A turbo-fed internal combustion engine has a first and a second exhaust-gas valve per cylinder, these exhaust-gas valves each being connected to their respective exhaust manifold. One exhaust manifold conducts exhaust gases to an exhaust-gas turbine and the other exhaust manifold conducts subsequent exhaust gases past this exhaust-gas turbine which drives a compressor for charge air. The intake valve of the cylinder is arranged so as, as the engine speed increases, to close either earlier, before the piston reaches its bottom dead center, or later, after the piston has passed its bottom dead center. In this way, the temperature increase resulting from compression in the cylinder is reduced. Cooled air from the compressor can be taken in so as to obtain an adequate degree of filling in the cylinder, with a lower final temperature.

9 Claims, 2 Drawing Sheets

COMBUSTION ENGINE

TECHNICAL FIELD

The invention relates to an internal combustion engine provided with a system for controllably opening and closing exhaust and intake valves to the cylinders.

STATE OF THE ART

Within the area of vehicle technology, it is becoming increasingly common to use turbocharged engines, that is to say engines in which supercharging is effected by means of a compressor which is driven by an exhaust-driven turbine. At high power, greater charging is used than in an ordinary engine. In order, in this connection, to avoid knocking and excessively high combustion pressures, ignition is set relatively late. This in turn results in the expansion possibility for the combusted gases being small, at the same time as the temperature reduction during expansion does not have time to become as great. The exhaust-gas temperature is therefore high. The problems are aggravated by the fact that the proportion of residual gases in the cylinder is high, with attendant heating of the new charge and risk of premature ignition of the same. In order that, to the greatest possible extent, the exhaust-gas temperature is manageable, it is usual, at high power output, to use a rich mixture for the engine, with surplus fuel serving as a coolant in the cylinder.

At full throttle, a poor volumetric efficiency is obtained as a result of a negative pressure difference between inlets and outlets during the period when inlet valves and outlet valves are open simultaneously. At low engine speed, this negative pressure difference is caused by a disruptive pressure pulse in the exhaust branch pipe from the next cylinder igniting. At high engine speed, throttling of the engine at the exhaust-gas turbine also contributes to creating a negative pressure difference.

It has been shown that only the exhaust-gas pulse which is delivered to the exhaust-gas turbine in the bottom dead-centre position of the piston can be used effectively for driving the exhaust-gas turbine, while the remaining exhaust gases have a pressure which is far too low to make an additional contribution.

For the purpose of improving the operation of the exhaust-gas turbine, it is previously known from GB 2 185 286 to divide the exhaust-gas flow so that only the high-pressure pulse goes to the exhaust-gas turbine, while the low-pressure pulse bypasses the exhaust-gas turbine. In this way, disruptive pressure pulses are eliminated and the negative low-pressure cycle is converted into a positive low-pressure cycle. This is achieved by virtue of the fact that there are at least two exhaust valves in every cylinder, which open differently and feed different exhaust manifolds.

The result is better ventilation of the cylinder, by means of which the proportion of residual gases is reduced. The combustion is better and ignition can be set earlier as knocking only appears at a higher pressure than previously.

As the load increases, pressure limitations are required because of knocking, as a result of which the charging pressure must be limited at higher loads. This has a negative effect on the performance of the engine.

THE OBJECTS OF THE INVENTION

It is an object of the invention to provide an improved internal combustion engine. Still another object is to achieve better performance of the internal combustion engine at high load.

SUMMARY OF THE INVENTION

The object of the invention is achieved by producing an internal combustion engine as indicated in the introduction with the features which are indicated in Patent Claim 1.

An internal combustion engine in accordance with the invention makes it possible to bring about effective charging as the engine speed increases by carrying out a greater part of the compression outside the cylinder and by cooling compressed air before it enters the cylinder. This makes possible a good degree of filling and also a lower temperature in the cylinder than if all the compression took place in it. The result is that the temperature of the ready-compressed gas can be lowered on the order of 50–100° C., with the attendant favorable effect on the knocking tolerance and the exhaust-gas temperature.

The invention can be realized in an embodiment in which the intake valve closes either early, while the piston is on the way down, or late, while the piston is on the way back up. In the former case, the air taken in has time to expand and cool in the cylinder before compression begins. In the latter case, some of the air taken in is discharged again while the piston is on its way up before compression.

The combination of the divided exhaust-gas period and the method selected for charging the cylinder (Miller principle) consequently makes possible an improvement in performance at higher engine speed and high power but presupposes good variable valve control. If, for example, the compression ratio in the cylinder is reduced from 10.0:1 to 7.5:1 by closing the inlet valve roughly 60° later and at the same time increasing the absolute charging pressure by 50% (so as to maintain the pressure at the end of the compression stroke) and keeping the geometrical compression ratio unchanged, this has the same effect on the temperature at the end of the compression stroke as lowering the temperature in the inlet pipe by roughly 34° C. The thermal load in the engine and the formation of NOx are also reduced by turbocharging according to the Miller principle. Moreover, the fuel consumption can be reduced by roughly 5% as a result of the combusted gas imparting less heat to the walls of the combustion chamber and as a result of the piston performing a smaller proportion of the total compression work. In other words, during the first part of the intake stroke, the pressure inside the cylinder is higher during charging according to the Miller principle, which increases the efficiency.

According to the invention, it is advantageous if the arrangement is such that the intake valve, since it closes earlier as the engine speed increases, opens earlier also. The same can apply correspondingly for the exhaust-gas valves. This facilitates effective gas exchange.

Further features and advantages of the solution according to the invention emerge from the description and the other patent claims.

The invention will be described in greater detail below with reference to exemplary embodiments shown in the drawings.

DESCRIPTION OF EXEMPLARY EMBODIMENTS

Figure 1:
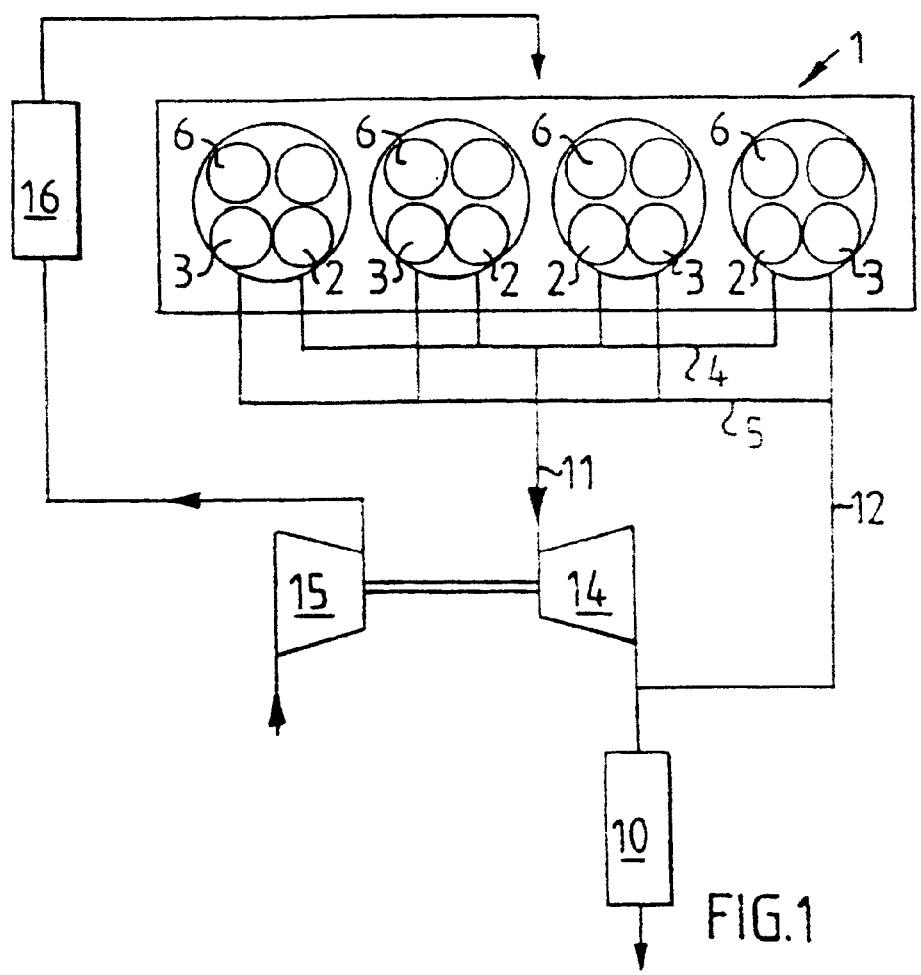
FIG. 1 shows an internal combustion engine according to the invention.

FIG. 1 shows diagrammatically a multi-cylinder internal combustion engine 1 according to the invention made as an Otto engine. The cylinders of the engine each have at least two exhaust-gas valves 2 and 3. From the first exhaust-gas valves 2 of the cylinders, exhaust gas is conducted out to a first exhaust manifold 4 common to the cylinders. From the second exhaust-gas valves 3 of the cylinders, exhaust gas is conducted out to a second exhaust manifold 5 common to the cylinders. The first exhaust manifold 4 is connected to a catalyst 10 via a first exhaust pipe 11, and the second exhaust manifold 5 is connected to the catalyst 10 via a second exhaust pipe 12. One or more silencers (not shown) is or are present in the conventional manner downstream of the catalyst 10.

The engine 1 is also equipped for supercharging by means of a compressor driven via an exhaust-driven turbine. The exhaust-gas turbine 14 is connected in the first exhaust pipe 11 and is consequently fed from the first exhaust manifold 4 and the first exhaust valves 2. A compressor 15 driven by the exhaust-gas turbine 14 provides the engine with charge air which is cooled in an intercooler 16. This charge air is in the conventional manner taken into each cylinder via one or more inlet valves 6 (not shown in detail).

Control of the valves can be effected in a number of different ways, for example by means of continuously variable cam adjustment for both the inlet and exhaust camshaft. However, a number of other methods are also possible.

A valve control suitable for the embodiment in FIG. 1 is shown in FIGS. 2 and 3, where FIG. 2 relates to low engine speed and FIG. 3 relates to high engine speed.

In each figure, the left diagram represents an inlet valve, while the right diagram represents the exhaust-gas valves. In each diagram, A indicates the top dead centre of the piston and B the bottom dead centre of the piston, C the opening position of the valve, D the closing position of the valve and E the open time of the valve. With regard to the exhaust-gas valves (FIGS. 2b and 3b), the first exhaust-gas valve 2 is in principle open at F, around the bottom dead centre B, while the second exhaust-gas valve 3 is in principle open afterwards, at G. The transition between these open times is indicated by H. (In reality, the exhaust-gas valves have a certain overlap during their open time, but for the purpose of simplification, this is disregarded in the drawing.)

Figure 2A:
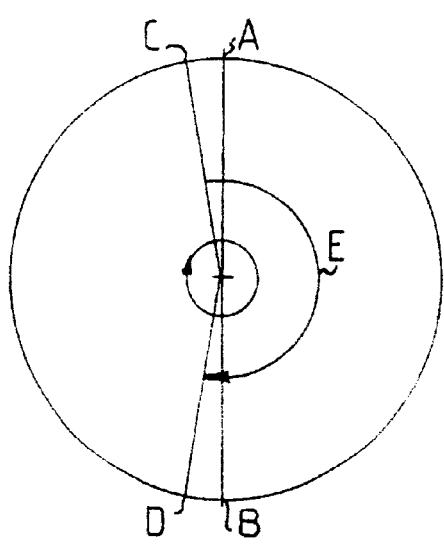
FIG. 2 shows a valve diagram for intake and discharge valves in the engine in FIG. 1 at low engine speed, and FIG. 3 corresponds to FIG. 2 but shows the situation at high engine speed, in the case of early closing of the intake valve, and FIG. 4a corresponds to FIG. 3a, in the case of late closing of the intake valve.
Figure 2B:
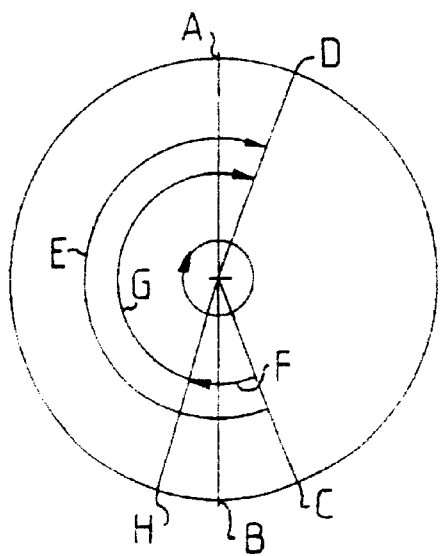

As can be seen, according to FIG. 2a, at low engine speed the inlet valve 6 opens at C, roughly 5° before the top dead centre A and is kept open until D, roughly 5° after the bottom dead centre B. In a corresponding manner, according to FIG. 2b, at low engine speed a first exhaust-gas valve 2 opens at C, roughly 25° before the bottom dead centre B, and the second exhaust-gas valve 3 finally closes at D, roughly 15° after the top dead centre. The overlap between inlet valves and exhaust-gas valves is in this connection roughly 20°.

Figure 3A:
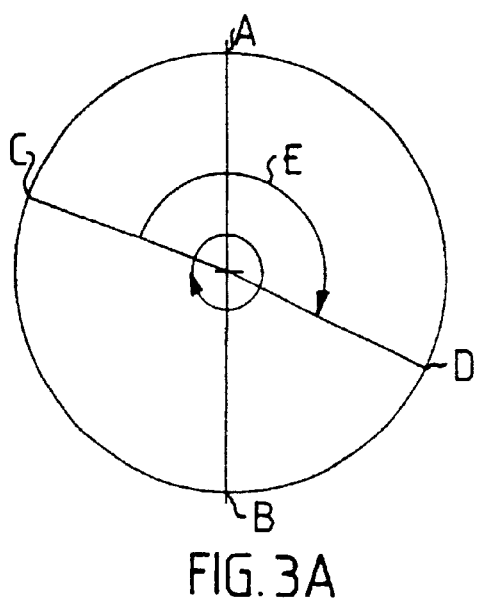
Figure 3B:
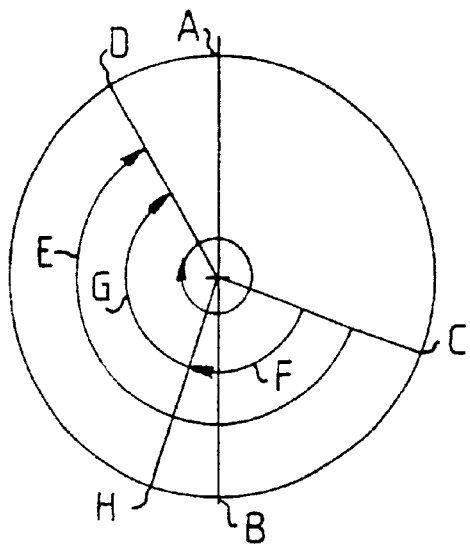

At high engine speed, according to FIG. 3a, the inlet valve opens at C, as early as roughly 75° before the top dead centre A, and closes at D, as early as roughly 65° before the bottom dead centre B. In a corresponding manner, according to FIG. 3b, at high engine speed a first exhaust-gas valve 2 opens at C, as early as roughly 70° before the bottom dead centre B, and the second exhaust-gas valve 3 finally closes at D, roughly 30° before the top dead centre A. The valve overlap between inlet valves and exhaust-gas valves in this case amounts to roughly 45°.

The principle is therefore that the inlet valve closes earlier as the engine speed increases, in this case an earlier setting by roughly 70°.

The opening of the exhaust-gas valves is also set earlier, but to a somewhat lesser extent, by roughly 45°.

As a result of the valve adjustment indicated, for example by camshaft adjustment, a valve overlap is obtained, which gives adequate time for emptying at high engine speed and ultimately an adequately early opening of the exhaust-gas valves at said high engine speed. Furthermore, the second exhaust-gas valve 3, which allows bypassing of the exhaust-gas turbine, is opened 45° earlier during the exhaust stroke, which means that the pumping work during the exhaust stroke is reduced still further.

If a requirement arises to use the Miller principle at average engine speed, a cam setting somewhere between those described should be used.

Figure 4A:
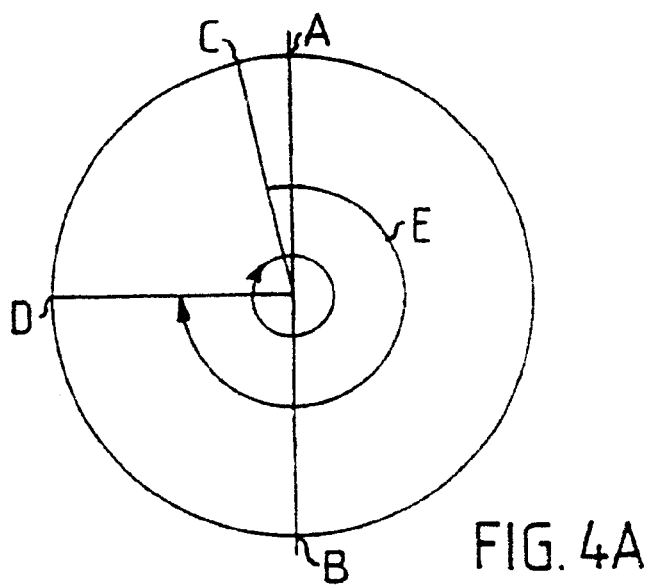

Instead of making the intake valve close early at high engine speed as in FIG. 3a, it is possible to make it close late. A valve control suitable for this embodiment is shown in FIG. 4a, where the intake valve opens at C, roughly 5° before the top dead centre A, and is kept open as far as D, roughly 90° after the bottom dead centre B. On the way up from the bottom dead centre B, the piston therefore has time to discharge some of the air already sucked in, so that compression is reduced.

If the charging pressures are selected so that pressures which are equally great are achieved at the end of the compression stroke both with conventional turbocharging and with charging according to the invention, using the Miller principle and with later inlet-closing of roughly 90° (crankshaft degrees), an increase of roughly 10% in the air mass enclosed in the cylinder is obtained in the solution according to the invention. This is due to the fact that the charge has a higher density, and the result is an increase in power of roughly 17%, distributed with roughly ¾ in the working cycle and roughly ¼ in the gas-exchange cycle. This increase in power of 17% is obtained with the point of time for combustion remaining unchanged. If use is made of combustion which is set earlier, which is possible as a result of the reduced risk of knocking, the working cycle is improved still further, with a greater increase in power as a result.

The combination of divided exhaust-gas discharge and turbocharging according to the Miller principle therefore makes possible performance which was previously not within reach.

What is claimed is:

1. Internal combustion engine comprising a plurality of cylinders and with divided exhaust-gas flow, each cylinder containing therein a respective piston displaceable toward and away from a piston dead center position within the cylinder, each cylinder having at least a first and a second exhaust-gas valve and at least one intake valve;

first and second exhaust manifolds providing the divided exhaust-gas flow from the cylinders, each first exhaust-gas valve being connected to the first exhaust manifold and each second exhaust-gas valve being connected to the second exhaust manifold, a turbocompressor provided with an exhaust-gas driven turbine, the turbocompressor having an inlet connected to the first exhaust manifold for driving the exhaust gas turbine with the exhaust gas from the first exhaust manifold, the turbocompressor having an outlet connected with the intake valves for supercharging the internal combustion engine, an exhaust system connected to the first exhaust manifold downstream in a flow of exhaust gas from the first exhaust manifold past the turbine, the second exhaust manifold being connected to the exhaust system of the engine downstream of the exhaust gas turbine in the exhaust system, the at least one intake valve is operable so that at low engine speed, the at least one intake valve closes around the bottom dead center position of each respective piston, and, as the engine speed increases, the at least one intake valve closes at a greater time interval from the point in time when the respective piston reaches the bottom dead center position.

2. Internal combustion engine according to claim 1, wherein the intake valve is operable so that as the engine speed increases, the intake valve closes later, after the piston has reached the bottom dead center position, whereby a certain quantity of air which has been taken in is discharged again before the intake valve closes.

3. Internal combustion engine according to claim 1, wherein the intake valve is operable so that as the engine speed increases, the intake valve closes earlier, before the piston reaches the bottom dead center position, whereby air which has been taken in has time to expand and cool while the piston is moving towards the bottom dead center position.

4. Internal combustion engine according to claim 3, wherein the intake valve is operable such that as the engine speed increases, the intake valve opens earlier than at low engine speed.

5. Internal combustion engine according to claim 3, wherein the exhaust-gas valves are operable so that as the engine speed increases, the exhaust gas valves open earlier than at low engine speed.

6. Internal combustion engine according to claim 5, further comprising a camshaft belonging to and operating the outlet valves, the camshaft being arranged so that on transition from low to high engine speed, the camshaft is adjusted by a maximum of about 45 crankshaft degrees.

7. Internal combustion engine according to claim 3, wherein the exhaust-gas valves are operable so that as the engine speed increases, the exhaust gas valves close earlier than at low engine speed.

8. Internal combustion engine according to claim 3, further comprising a camshaft belonging to and operating the inlet valve, the camshaft being arranged so that on transition from low to high engine speed, the camshaft is adjusted by a maximum of about 70 crankshaft degrees.

9. Internal combustion engine according to claim 1, further comprising a charge-air cooler arranged upstream of the intake valve and downstream of the compressor.

\* \* \* \* \*